(No Model.)
J. R. THURMEND.
NUT LOCK.
No. 601,915. Patented Apr. 5, 1898.
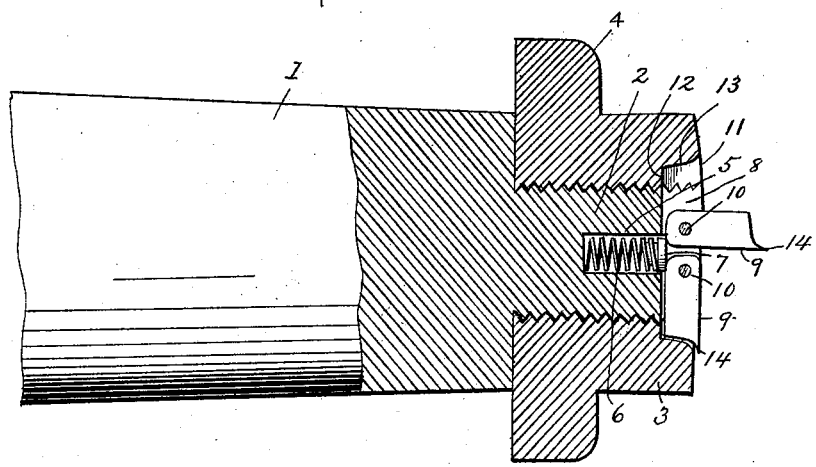
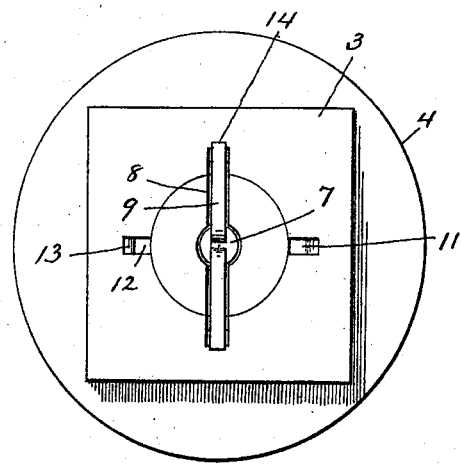
WITNESSES
INVENTOR
John R. Thurmend:
By
Attorney

UNITED STATES PATENT OFFICE.

JOHN R. THURMEND, OF DENVER, COLORADO.

NUT-LOCK.

SPECIFICATION forming part of Letters Patent No. 601,915, dated April 5, 1898.

Application filed March 5, 1897. Serial No. 625,963. (No model.)

*To all whom it may concern:*

Be it known that I, JOHN R. THURMEND, a citizen of the United States, residing at Denver, in the county of Arapahoe and State of Colorado, have invented certain new and useful Improvements in Nut-Locks; and I do hereby declare the following to be a full, clear, and exact description of the invention, such as will enable others skilled in the art to which it appertains to make and use the same.

This invention relates to nut-locks, and has for its object to provide a simple and convenient lock for holding the nuts of vehicle-axle spindles in place, the improved lock enabling the nut to be readily removed and as readily replaced.

The invention consists in an improved nut-lock embodying certain novel features and details of construction and arrangement of parts, as hereinafter fully described, illustrated in the drawings, and pointed out in the claim.

In the accompanying drawings, Figure 1 is a sectional view showing a portion of an axle-spindle and a nut equipped with the improved nut-lock. Fig. 2 is an end view of a nut and axle.

Similar numerals of reference designate corresponding parts in both figures of the drawings.

Referring to the drawings, 1 designates a portion of the axle-spindle, the outer end of which is reduced, as indicated at 2, and exteriorly threaded to receive the usual spindle-nut 3, having at its inner side a circumferential flange 4.

For the purpose of carrying out the present invention the spindle is provided in its reduced end 2 with a longitudinal recess 5, in which is arranged a spiral spring 6, bearing at its outer end a cap-plate 7. The extremity of the spindle is provided with a diametrical groove 8, and in this groove are pivotally mounted radially-arranged dogs or catches 9. These dogs or catches are pivoted within the groove 8 at their inner ends on short transverse pins 10, and they project at their outer ends beyond the surface of the reduced portion 2 of the spindle, so as to engage oppositely-located notches 11 in the nut 3 for the purpose of preventing relative rotation between the spindle and nut. Any number of these notches 11 may be employed, according to the number of adjustments which it is desired to impart to the nut. The inner wall or floor 12 of each notch is extended at a right angle to the plane of the spindle, while the remaining or outer wall 13 of the notch is inclined or oblique to said plane. Each of the dogs is provided at its outer end with an overlapping or overhanging lip 14, adapted to rest against the outer surface of the nut and to offer a finger or nail hold for facilitating the manipulation of the dogs for the purpose of placing the nut in position on the spindle or removing it therefrom.

From the foregoing description it will be seen that after the nut is screwed in place upon the spindle the dogs may be thrown into a position in which they extend in opposite directions from each other and engage the nearest notches 11 in the nut. In this position the dogs are held by means of the spiral spring 6, which forces the cap-plate 7 against the dogs, as clearly shown in Fig. 1. By reason of the frictional and yielding engagement between said cap-plate and the dogs the said dogs will be held in any position to which they may be adjusted.

The improved nut-lock is extremely simple in construction, may be manufactured at slight cost, and forms a positive lock.

While the improved nut-lock is especially adapted for vehicles, it will be of course understood that the principle involved may be utilized in connection with other forms of nuts and that the device is susceptible of changes in the form, proportion, and minor details of construction, which may be accordingly resorted to without departing from the spirit or sacrificing any of the advantages of the invention.

Having thus described the invention, what is claimed as new, and desired to be secured by Letters Patent, is—

The combination with a threaded object, and a nut designed to fit thereon, of a pair of dogs pivotally mounted in a diametrical groove in the extremity of said object and projecting radially beyond the outer threaded surface thereof, said dogs being adapted to fold entirely within the plane of the nut, the nut having in its outer face oppositely-located notches terminating short of the outer edges of the same and adapted to receive said dogs wholly within the plane of the nut, and means for holding said dogs in either their operative or inoperative positions, substantially as described.

In testimony whereof I have signed this specification in the presence of two subscribing witnesses.

JOHN R. THURMEND.

Witnesses:
W. H. HARNARCH,
LOUIS GOUGAR.